UNITED STATES PATENT OFFICE.

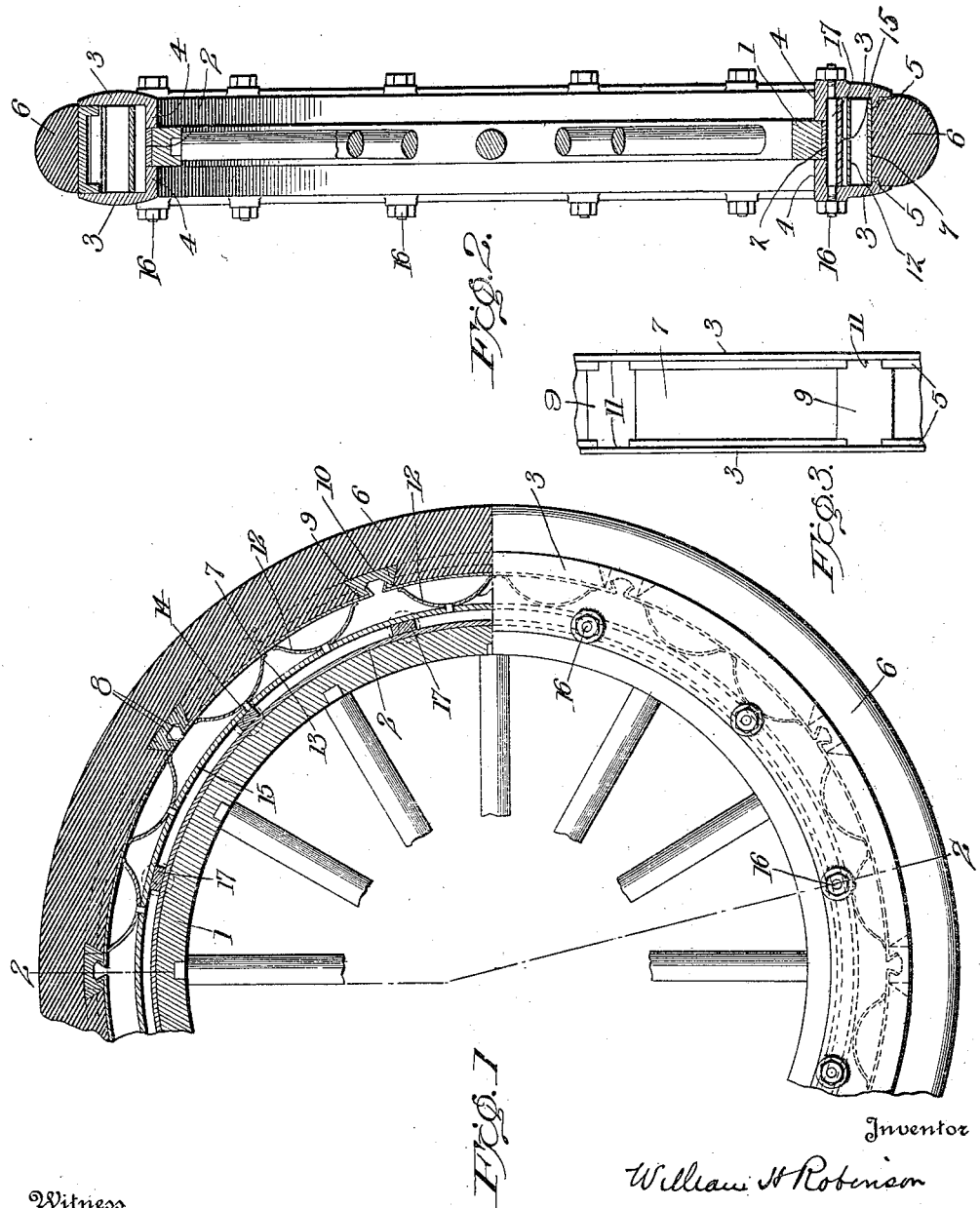

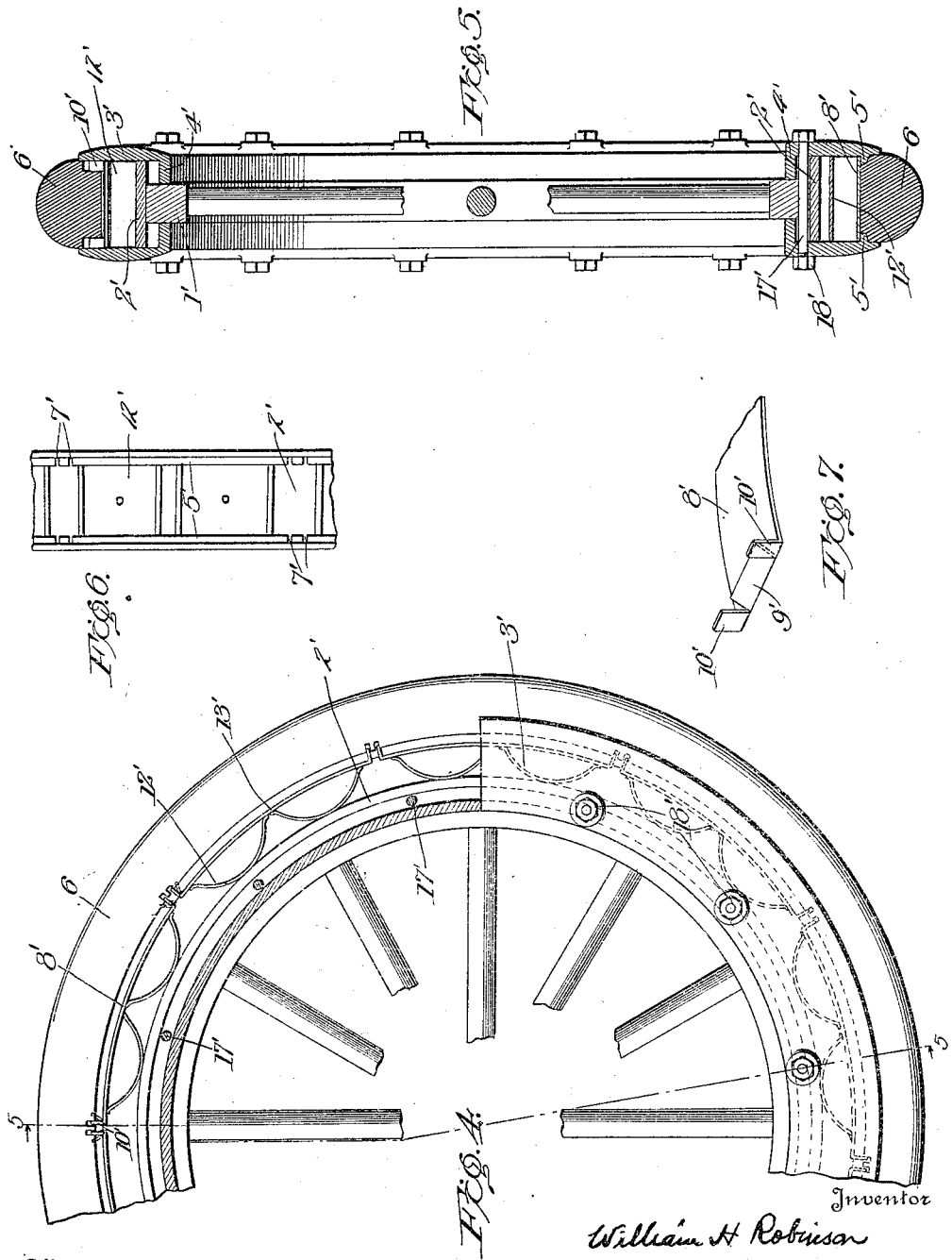

WILLIAM H. ROBINSON, OF BROOKLYN, NEW YORK, ASSIGNOR TO GEORGE H. BROWN, OF BROOKLYN, NEW YORK.

SPRING-WHEEL.

1,272,852.  Specification of Letters Patent.  Patented July 16, 1918.

Application filed October 20, 1916. Serial No. 126,792.

*To all whom it may concern:*

Be it known that I, WILLIAM H. ROBINSON, a citizen of the United States, residing at Brooklyn, in the county of Kings and State of New York, have invented certain new and useful Improvements in Spring-Wheels, of which the following is a specification.

This invention relates to spring wheels and particularly to one in which springs are disposed within the rim of the wheel beneath the resilient tire and are completely protected from moisture and oxidation. All the interior wearing surfaces are of metal and easily assembled and replaced.

The invention is illustrated in the drawings in which—

Figure 1 is a side elevation, part in section, of the rim and tire of one form of wheel;

Fig. 2 is a transverse section on the line 2—2 of Fig. 1;

Fig. 3 is a plan view of a portion of the wheel with the tire removed, showing the means for preventing longitudinal displacement of the tire;

Fig. 4 is a side view of a modified form of wheel, the upper half being in section;

Fig. 5 is a transverse section on the line 5—5 of Fig. 4;

Fig. 6 is a plan view of a portion of the modified form of wheel with the tire and its facing-plate removed showing the means for preventing longitudinal displacement of the tire; and Fig. 7 is a perspective view of the end of one of the facing plates of the tire, showing the manner in which the ends are upturned.

Referring to the drawings, (Figs. 1–3), the wheel comprises a felly 1, preferably of wood, encircled by a metallic band 2. Circular flanged plates 3 are disposed on each side of felly 1 and have inwardly extending bottom flanges 4 which contact with the sides of felly 1 and band 2 throughout their length. When in position these plates form an interior closed chamber. The outer edges of plates 3 have inwardly extending flanges 5 which form a partial support for the resilient tire 6, but primarily form a water and dust tight joint therewith. A series of metal plates 7, having reflexed ends 8, constitute an interior lining for the tire 6. The ends 8 engage metal sockets 9, opening inwardly, and transversely disposed in the inner face of the tire 6, in undercut recesses 10 formed therein. These sockets 9 extend at each end into corresponding recesses 11 in the flanges 5 formed by cutting away portions of the flanges 5, this construction serving to prevent creeping or longitudinal movement of the tire. The effect of this construction is to provide a series of metallic plates, extending in the form of a flexible band around the entire inner face of the tire 6.

Leaf springs 12, each consisting of one or more metal plates, preferably semi-elliptical in form and having reflexed ends 13, are located within the chamber beneath the tire 6 and are secured at their central portions by pins, bolts or studs 14, to a metal spring band 15, which may be of the same sort of metal as the springs 12. The ends of springs 12 bear against the plates 7 and move easily thereon when subjected to the varying stresses incident to service.

These various parts are held together on felly 1 by means of bolts 16, the ends of which pass through openings in the plates 3 and have tightening nuts thereon. The central body portions of these bolts are of rectangular form 17 and of a thickness exactly equal to the space between band 2 and spring band 15 and pass between these two at spaced intervals around the wheel, forming a support for spring band 15. To the resiliency of the springs 12 is added that of the spring band 15 which carries these springs 12.

The modified form of wheel, as illustrated in Figs. 4–7, is constructed as follows:—

The wheel comprises a wooden felly 1', which has secured thereto a metal rim 2', faced on both sides by circular plates 3', having inwardly extending flanges 4' on their inner edges which grip the sides of the felly 1'. The upper edges of plates 3' have inwardly extending preferably beveled flanges 5' which form a partial support for the tire 6' but primarily form therewith a water and dust tight joint. Rubber cement may be applied to the portions of the tire in contact with flanges 5' and the outer edges of plates 3'. Slots 7' are cut in the flanges 5' at intervals, for a purpose to be hereinafter described. A series of metal plates 8' constitute an interior lining for the tire.

These plates have substantially the width of the channel and bear against the inner side of flanges 5', similar to the construction in Figs. 1–3. The ends of these plates 8' (see Fig. 7) are cut and then upturned. A central ear 9', of the same width as the inner face of the tire is turned up and back at an acute angle. This upturned ear is molded right into the tire 6' itself. On either side of central ear 9' two side ears 10' project upward at right angles to plate 8'. These ears project up on each side of the tire and when the tire 6' is in place project through the slots 7' in the flanges 5' of the plates 3'. The tire, being molded to ear 9' of plate 8', is locked through ears 10', to plates 3' and longitudinal creeping of the tire 6' is thereby prevented.

The upper part of tire 6' above the flange 5' (see lower half of Fig. 5.) is the full width of the space between flange plates 3' and contacts with flanges 5', forming a water and dust tight joint therewith. The ears 10' of plates 8' projecting up through slots 7' in the flanges 5' are deeper than the flanges 5' and extend above the same (see Fig. 5, upper half). Therefore, slots are molded in the tire 6' above the slots 7' in flanges 5', into which the ends of ears 10' extend. The ears 10' are thus made long so that when plates 8' and tire 6' are depressed to their maximum distance under heavy strains, the ears 10' will still engage in slots 7'. Springs 12' are pinned at intervals to rim 2' with their upper edges 13' slightly turned over and bearing against the under faces of plates 8'. Bolts 17' extend through the felly 1' and clamp the plates 3' to the felly by means of nuts 18' thereon.

This structure, it is readily seen, is one which is compact, noiseless, easily assembled, having parts which are easily replaced, and in which the interior wearing surfaces are entirely inclosed against dirt and moisture. In practice graphite or other lubricant may be introduced into the closed space between the rim and tire and distributed therein by the rotation of the wheel.

Long continued use under the most difficult service conditions has shown a wheel constructed as above described to be noiseless and proof against atmospheric or road conditions; it possesses great resilience, being fully equal in this respect to the usual pneumatic tires, and is not liable to breakage or derangement under the severest usage.

I claim:—

1. A spring wheel comprising a felly, side plates contacting with the felly to form a channel, means for uniting the felly and the side plates, a tire in said channel, facing plates on the inner surface of the tire and rigidly connected thereto, a flange on the inner face of each side plate adapted to give support to the tire, means on the facing plates and the said flanges for interlocking the tire and side plates against relative circumferential movement and springs between the felly and the facing plates.

2. A spring wheel comprising a felly, side plates contacting with the felly to form a channel, means for uniting the felly and the side plates, a circular band in said channel peripherally contacting with the felly and contacting with the inner faces of the side plates, a tire in said channel, facing plates on the inner surface of the tire adapted to substantially close the channel, a flange on the inner side of each side plate adapted to give support to the tire and means on the said flanges and facing plates for interlocking the tire and side plates against relative circumferential movement and springs interposed between the circular band and the facing plates of substantially the width of the channel.

3. A spring wheel comprising a felly, side plates contacting with the felly to form a channel, means for uniting the felly and the side plates, a flange on the inner face of each side plate, a tire, facing plates on the inner face of the tire, recesses in the flanges and projections on the facing plates for interlocking the tire and side flanges against relative circumferential movement, said flanges and facing plates coöperating to form a substantially continuous closure of the channel and springs within the channel to resiliently support the tire on the felly.

4. A spring wheel comprising a felly, side plates contacting with the felly to form a channel, means for uniting the felly and the side plates, a substantially continuous flange on the inner face of each of the side plates, a tire seated on the outer side of said flanges, facing plates on the inner face of the tire having support on the inner side of said flanges and forming a substantially continuous closure of the channel, recesses in the flanges and tongues on the facing plates for interlocking the tire and the side plates against relative circumferential movement and springs within the channel to resiliently support the tire on the felly.

5. A spring wheel comprising a felly having side walls forming a channel, means on the side walls of the channel for partially supporting a tire, a tire in said channel bearing on said means, facing plates for the inner surface of the tire, spring members in said channel between the felly and the tire, and means on said plates for engaging both the tire and the channel walls to prevent creeping.

6. A spring wheel comprising a felly, having side plates forming a channel, inwardly extending flanges on the outer edges of said side plates, slots in said flanges, a tire in said channel bearing on said flanges, facing plates for the inner surface of the tire, spring members between the tire and the felly having their free ends bearing on the facing plates and means on said plates for engaging with the tire and with said slots for preventing peripheral movement of the tire with respect to the felly.

7. A spring-wheel comprising a felly, circular plates on the sides of said felly forming a channel, means for holding said plates on said felly, flanges on said plates, a tire seated on said flanges in said channel, facing plates on the inner side of said tire, resilient means between the tire and the felly, and means on said facing plates for engaging the tire and the flanges to prevent peripheral movement of the tire.

8. A spring-wheel comprising a felly, a circular plate on each side of said felly forming a channel, means for holding said plates to said felly, inwardly extending flanges on the outer edges of said plates, slots in said flanges, a tire resting on said flanges, metal facing plates on the inner face of said tire, said plates being of equal width with the channel, an upturned central ear on each end of each of said facing plates, said central ears being molded into the tire, and an upturned ear on each side of each central ear projecting into the slots in the flanges, slots in the tire above said flanges to receive the upper ends of said side ears, and resilient means between the tire and said felly.

In testimony whereof I affix my signature in presence of two witnesses.

WILLIAM H. ROBINSON.

Witnesses:
Joseph E. Reid,
C. E. Potarien.

Copies of this patent may be obtained for five cents each, by addressing the "Commissioner of Patents, Washington, D. C."